United States Patent
Galguera

(10) Patent No.: US 7,022,915 B1
(45) Date of Patent: Apr. 4, 2006

(54) PROTECTIVE COVER SYSTEM FOR PAINTING APPLICATIONS

(75) Inventor: Ernesto Galguera, Hialeah, FL (US)

(73) Assignee: Ato-Ernesprise, Inc., Hialeah, FL (US)

( * ) Notice: Subject to any disclaimer, the term of this patent is extended or adjusted under 35 U.S.C. 154(b) by 0 days.

(21) Appl. No.: 11/177,171

(22) Filed: Jul. 11, 2005

(51) Int. Cl.
*H02G 3/14* (2006.01)

(52) U.S. Cl. ............................ 174/66; 174/67; D8/353; 220/241

(58) Field of Classification Search .................. 174/66, 174/67; 220/241, 242; D8/353; D13/152
See application file for complete search history.

(56) References Cited

U.S. PATENT DOCUMENTS

| 4,656,058 A | 4/1987 | Stark ........................... 427/282 |
| 4,695,486 A | 9/1987 | Stark ........................... 427/282 |
| 5,723,817 A * | 3/1998 | Arenas et al. ................ 174/66 |
| 6,559,381 B1 * | 5/2003 | Shotey et al. ................. 174/66 |
| 6,803,522 B1 | 10/2004 | Skakun ........................ 174/66 |
| 6,806,425 B1 * | 10/2004 | O'Neill ........................ 174/66 |

* cited by examiner

*Primary Examiner*—Dhiru R. Patel
(74) *Attorney, Agent, or Firm*—Sanchelima & Assoc., P.A.

(57) ABSTRACT

A removable protective cover system to prevent application of paint on cover plates having electronic outlets and switches, and doorknobs having door handles. The system includes a cover plate cover assembly, and a doorknob cover assembly that is conical in shape.

6 Claims, 5 Drawing Sheets

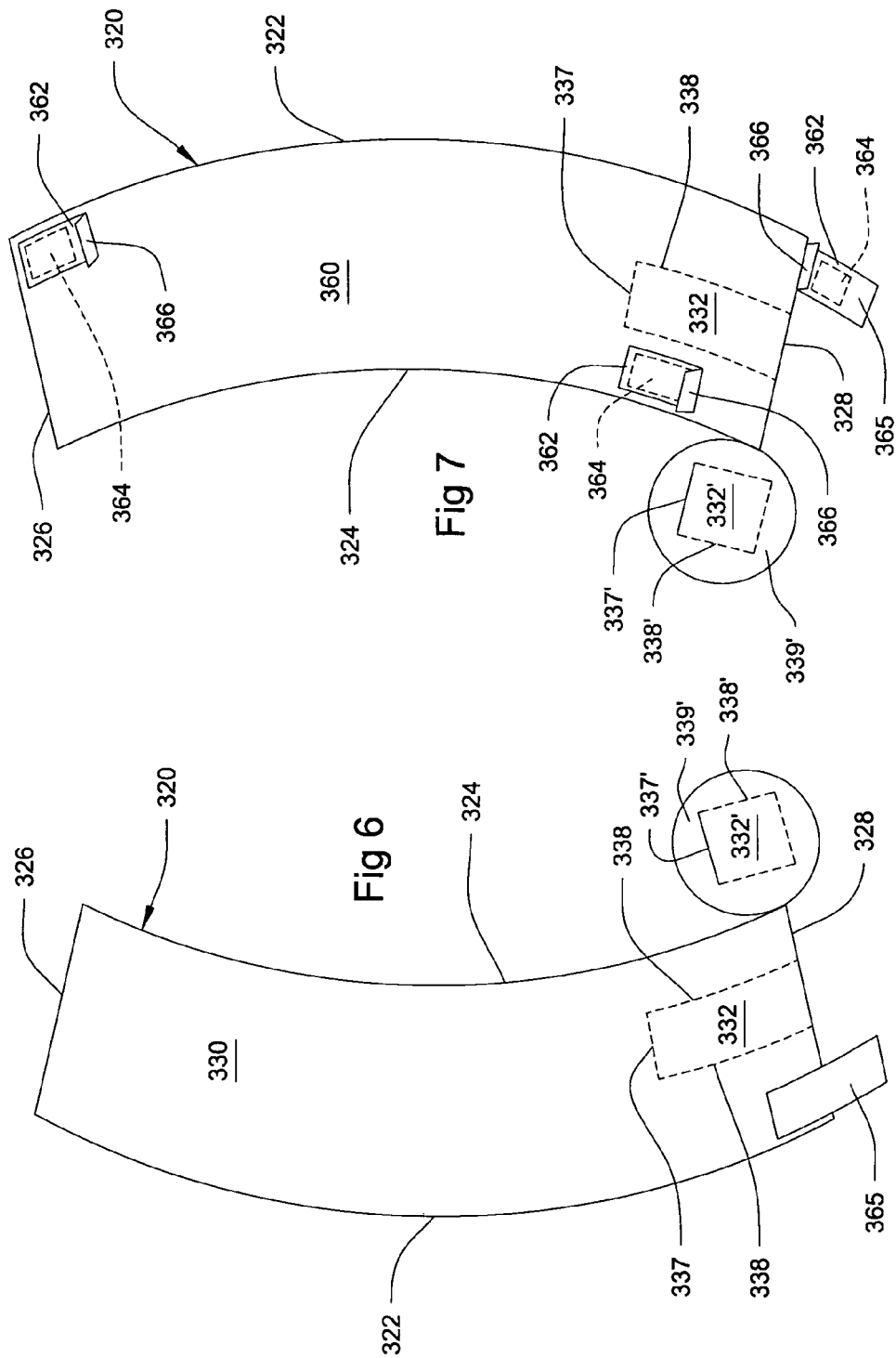

PROTECTIVE COVER SYSTEM FOR PAINTING APPLICATIONS

BACKGROUND OF THE INVENTION

1. Field of the Invention

The present invention relates to a system for masking or covering surfaces of articles, to prevent paint or other surfaces from coming in contact with these as protected surfaces and more particularly, to protective covers used to prevent application of paint on cover plates and doorknobs, for electronic outlets and switches, and door handles respectively.

2. Description of the Related Art

Painting is a time consuming task. And preparing a room for painting also takes time. In some cases, a person will remove cover plates and doorknobs to ensure that paint is not applied to them. However, this is a cumbersome task and eventually the cover plates and doorknobs will be replaced. In addition, removing cover plates leaves outlets exposed that may be dangerous, and removing door handles may make doors unusable. There is a need for a protective cover system for masking or covering surfaces of articles, to prevent paint or other surfaces from coming in contact with these as protected surfaces.

Several designs for paint shields have been designed in the past. None of them, however, includes cover plate cover and doorknob cover assemblies to prevent application of paint on cover plate and doorknob assemblies, for electronic outlets and switches, and door handles respectively.

Applicant believes that the closest reference corresponds to U.S. Pat. No. 4,656,058 issued to Stark on Apr. 7, 1987 for Paint shields and painting methods. However, it differs from the present invention because Stark teaches self-supporting paint shields that have at an end thereof a continuously annular wall portion defining an opening for receiving a circular object to be shielded. This annular wall portion has around that opening a tapering brim and has across that opening a diameter different from a diameter of that circular object. The annular wall portion is adaptable in diameter to the circular object and is adapted to extend with its tapering brim to a surface to be painted, while the continuously annular wall portion is in contact with the circular object at the mentioned end, thereby exerting a gripping action supporting the paint shield on the circular object. The paint shields preferably have a circumferential bevel extending in a continuous transition from an outer shield surface to the paint shield opening. Such opening preferably is smaller in diameter than the circular object, and the paint shield is twisted at the annular wall portion onto that object.

Applicant believes that another close reference corresponds to U.S. Pat. No. 6,803,522 issued to Skakun on Oct. 12, 2004 for Paint shield for cover plates for electrical outlets and switches. However, it differs from the present invention because Skakun teaches each of the embodiments of the invention having a rim, a deck and a raised portion on the deck to accommodate switch levers and television cable connectors. The rim fits closely around the perimeter of a cover plate and switch or outlet being shielded. The deck is generally parallel to the surface of the cover. Adhesive is applied to areas of the under surface of the deck which overlie the relatively smooth end areas of the cover plate. The shield has flexibility allowing for deflection under finger pressure to bring the adhesives into contact with the cover plate to securely attach the shield to the cover plate.

Applicant believes that another close reference corresponds to U.S. Pat. No. 4,695,486 issued to Stark on Sep. 22, 1987 for Paint shields and painting methods. However, it differs from the present invention because Stark teaches self-supporting paint shields that are wound into a spiral having an inside diameter different from a diameter of a raised circular object being shielded and having portions overlapping each others sufficiently to remain overlapping when this wound paint shield is adapted in diameter to a raised circular object. The overlapping portions in the wound paint shield are slidable relative to each other and are adapted to remain slidable relative to each other when the wound paint shield is fitted onto the raised object whereby the overlapping portions of the wound paint shield continue sliding relative to each other until the wound paint shield on the raised object is adapted in inside diameter to such raised object and exerts a gripping action supporting the wound paint shield on the raised object, whereby paint may be applied to a surrounding surface exclusive of the shielded object.

Other patents describing the closest subject matter provide for a number of more or less complicated features that fail to solve the problem in an efficient and economical way. None of these patents suggest the novel features of the present invention.

SUMMARY OF THE INVENTION

A removable cover system to prevent application of paint on cover plates and doorknobs, comprising a cover plate cover assembly comprising a first outwardly facing surface and a first inwardly facing surface. The first outwardly facing surface has first and second edges parallel and equally spaced apart from each other by third and fourth edges. The first outwardly facing surface is smooth to effectively repel paint. The cover plate cover assembly also comprises longitudinal lines that are parallel and equally spaced apart from each other by a horizontal borderline, to define first surfaces. The first surfaces may be lifted outwardly from the horizontal borderline at first hinges to facilitate mounting of the cover plate cover assembly upon a cover plate to use at least one switch. The first surfaces comprise second surfaces that may be lifted outwardly along first perforations at second hinges to facilitate mounting of the cover plate cover assembly upon the cover plate to use at least one receptacle. The first inwardly facing surface is matte and porous to effectively adhere to the cover plate. The first inwardly facing surface comprises at least one adhesive tab with wax paper. The wax paper has at least one corner tab to facilitate a user in removing the wax paper from the at least one adhesive tab. The at least one adhesive tab has first adhesive means to keep the cover plate cover assembly securely adhered to the cover plate.

The instant invention also comprises a doorknob cover assembly that is conical in shape and abuts to a lock stile of a door. The doorknob cover assembly comprises a second outwardly facing surface and a second inwardly facing surface. The second inwardly facing surface comprises at least one adhesive tab with wax paper. The wax paper has at least one corner tab to facilitate the user in removing the wax paper from the at least one adhesive tab. The at least one adhesive tab has second adhesive means to keep the doorknob cover assembly securely adhered upon a doorknob assembly.

The doorknob cover assembly adheres upon a rim of the doorknob assembly, abutting the lock stile of the door. The doorknob cover assembly comprises third surfaces defined by second perforations. The third surfaces may be lifted outwardly along the second perforations at third hinges, to facilitate the mounting of the doorknob cover assembly upon the doorknob assembly having an elongated handle.

The doorknob cover assembly comprises a doorknob face having a fourth surfaces that is defined by third perforations. The fourth surfaces may be lifted outwardly along fourth perforations at fourth hinges to facilitate the user to insert a key into the doorknob assembly.

The first and second surfaces comprise connectors to connect the second surfaces to the first surfaces, and the first surfaces to each other at the horizontal borderline.

In the preferred embodiment, the doorknob cover assembly and the doorknob cover assembly are made of recycled paper material.

It is therefore one of the main objects of the present invention to provide a removable protective cover system for painting applications to prevent application of paint on cover plates and doorknobs, for electronic outlets and switches, and door handles respectively.

It is yet another object of this invention to provide such a system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 6 shows a side view of an uncoiled doorknob cover assembly 320 outwardly facing surface.

FIG. 7 shows a side view of the uncoiled doorknob cover assembly 320 inwardly facing surface.

DETAILED DESCRIPTION OF THE PREFERRED EMBODIMENT

Figure 1:
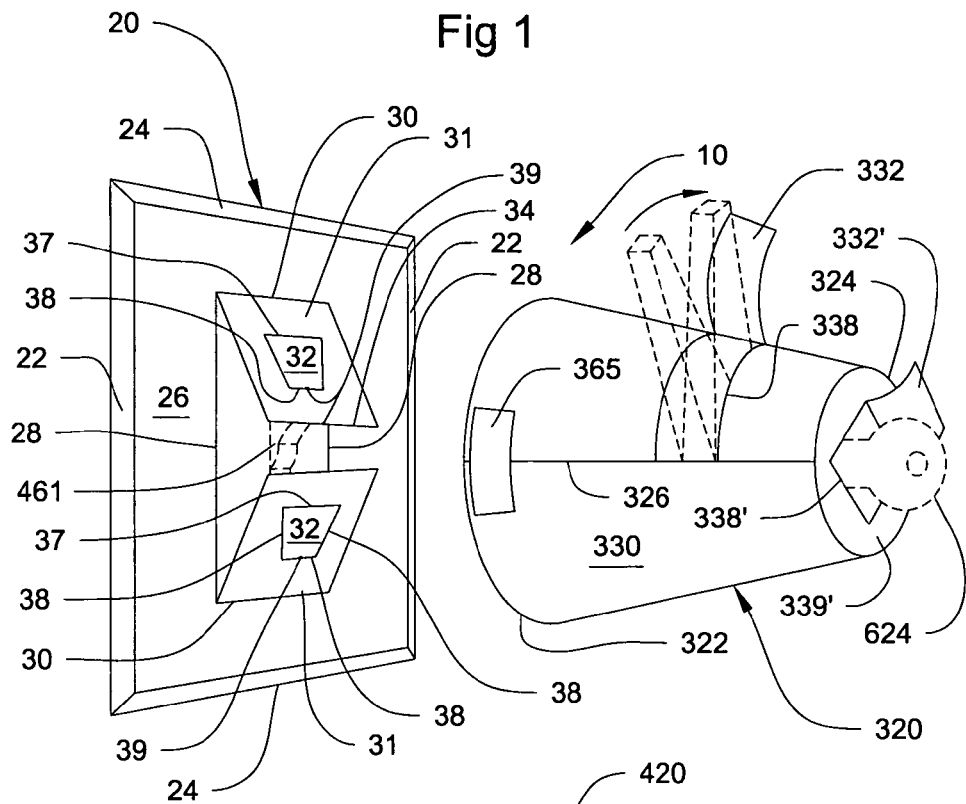
FIG. 1 is a perspective view of instant invention 10, wherein cover plate cover assembly 20 is partially covering a prior art switch 461, and door knob cover assembly 320 is partially covering doorknob assembly 620 and has a prior art key 624 partially inserted in it.

Referring now to the drawings, where the present invention is generally referred to with numeral 10, it can be observed that it basically includes cover plate cover assembly 20 and doorknob cover assembly 320.

As seen in FIG. 1, cover plate cover assembly 20 comprises outwardly facing surface 26 having edges 22 parallel and equally spaced apart from each other by edges 24. Outwardly facing surface 26 is smooth to effectively repel paint. Longitudinal lines 28 are parallel and equally spaced apart from each other by horizontal border line 34, all of which form a H-shaped die-cut that define surfaces 31. Surfaces 31 may be lifted outwardly from horizontal border line 34 at hinges 30, to facilitate the mounting of cover plate cover assembly 20 upon typical prior art cover plate having a switch, such as switch 461. Surfaces 32 may be lifted outwardly along their respective perforations 38 at hinges 37, to facilitate the mounting of cover plate cover assembly 20 upon typical prior art cover plate 420 having receptacles 432, seen in FIG. 2.

Also seen in FIG. 1 is doorknob cover assembly 320. Doorknob cover assembly 320 is conical in shape, whereby edge 322 is greater in diameter than edge 324. In use, edge 322 covers a doorknob and in the preferred embodiment, abuts to lock stile 622 of a door, seen in FIG. 8.

Figure 2:
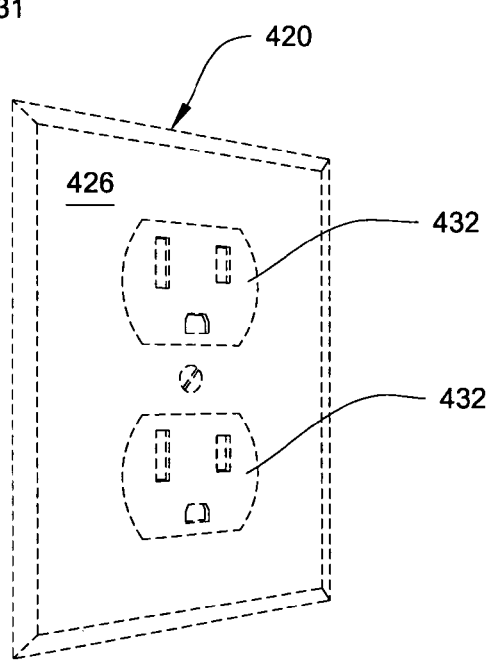
FIG. 2 is a perspective view of a prior art cover plate 420 and receptacles 432.

As seen in FIG. 2, a typical prior art cover plate 420 exposes receptacles 432. The majority of cover plates are made in accurate standardized shapes and sizes. Surface 426 of most cover plates expose receptacles 432. Surface 426 may also be slightly outwardly curved or there may be decorative designs molded into the cover plate 420. However, in all but a few instances, surface 426 is sufficiently smooth, flat or curved, so that cover plate cover assembly 20 may be employed effectively as a paint shield.

Figure 3:
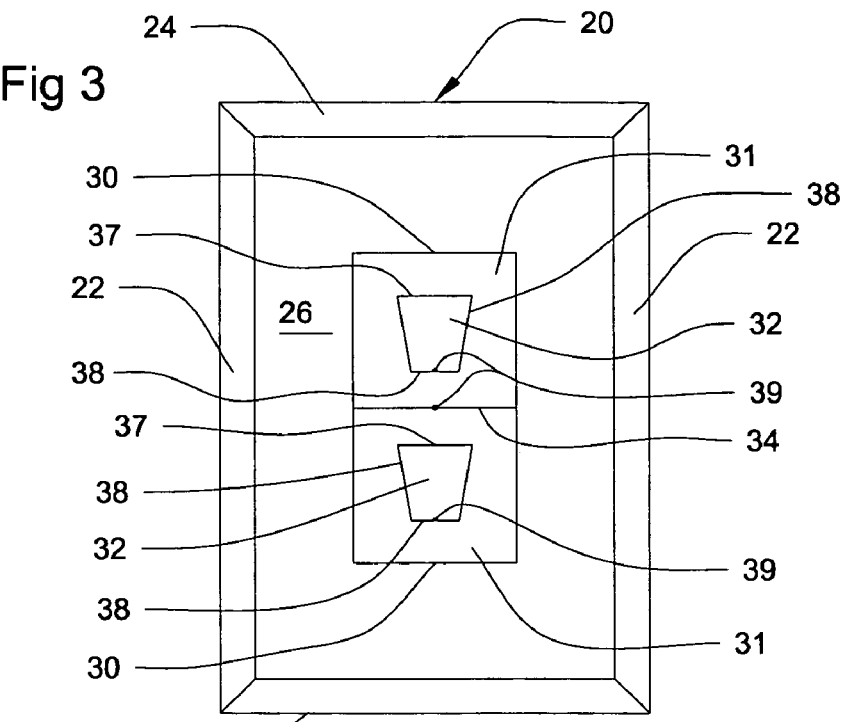
FIG. 3 shows a front view of cover plate cover assembly 20.

Seen in FIG. 3 is the front view of cover plate cover assembly 20 showing outwardly facing surface 26. In this illustration, cover plate cover assembly 20 is unused, wherein connectors 39 connect surfaces 32 to surfaces 31, and surfaces 31 to each other at horizontal borderline 34.

Figure 4:
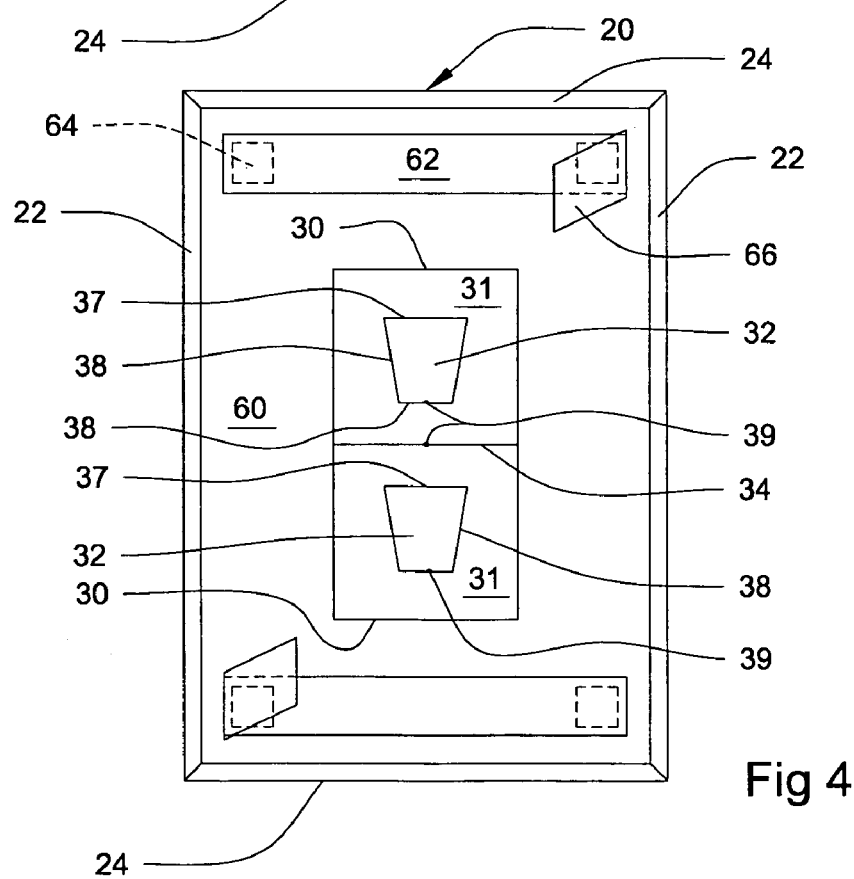
FIG. 4 shows a rear view of cover plate cover assembly 20.

As seen in FIG. 4, cover plate cover assembly 20 comprises inwardly facing surface 60. Inwardly facing surface 60 is matte and porous to effectively adhere to typical prior art cover plate 420. Located at predetermined areas of inwardly facing surface 60 is wax paper 62. In the preferred embodiment, wax paper 62 comprises at least one corner tab 66 to facilitate a user in removing wax paper 62 from adhesive tabs 64, defined as adhesive means. It is noted that corner tabs 66 do not have adhesive matter thereon. Adhesive tabs 64 are covered by wax paper 62 in this illustration. In the preferred embodiment, adhesive tabs 64 have adhesive means such as glue that functions to keep cover plate cover assembly 20 securely adhered upon typical prior art cover plate 420 when employed effectively as a paint shield.

Figure 5:
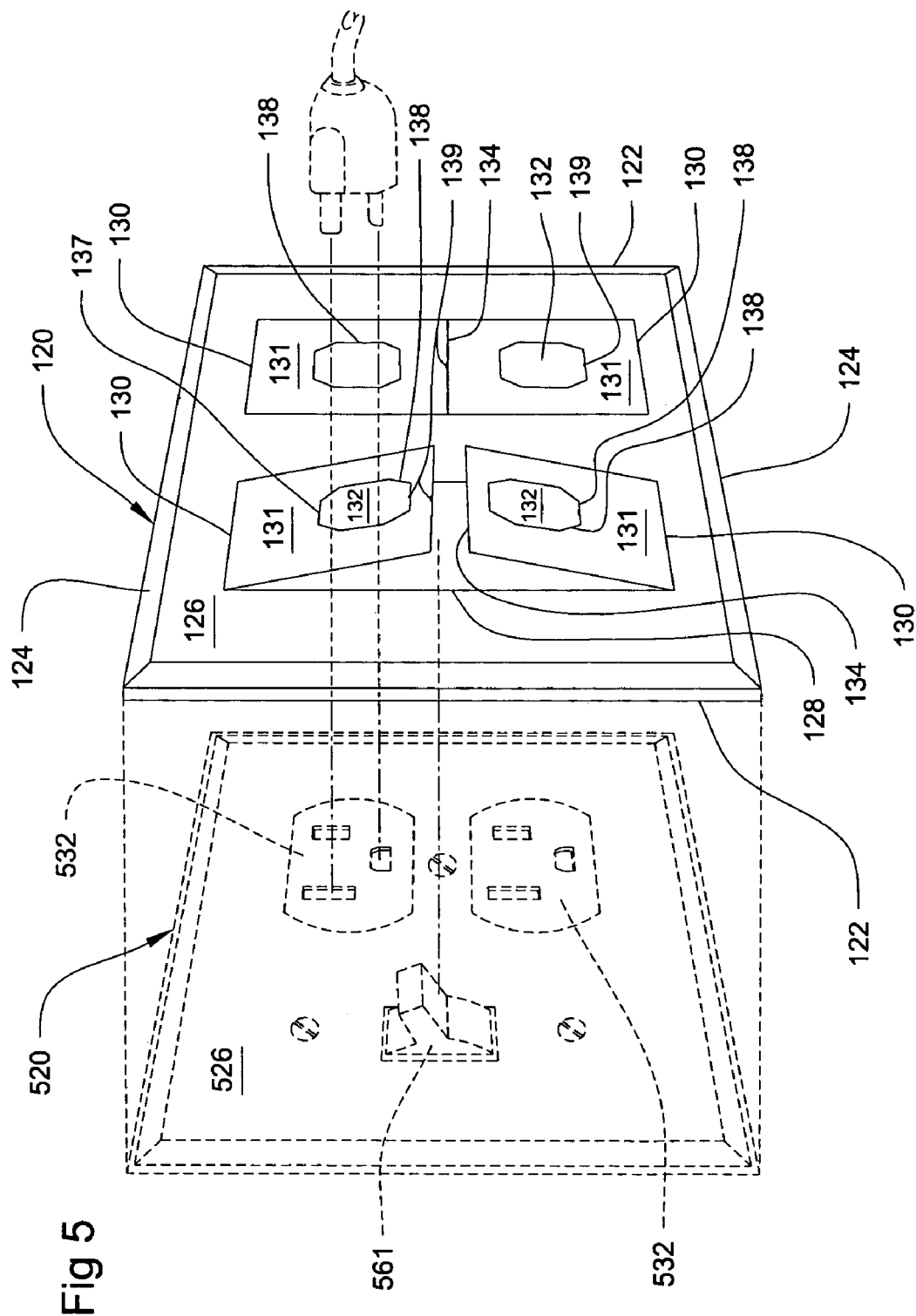
FIG. 5 shows a perspective view of a first alternate embodiment of the cover plate cover assembly 120 and another prior art cover plate 520.

Seen in FIG. 5 is an alternate embodiment cover plate, defined as cover plate cover assembly 120. It comprises outwardly facing surface 126 having edges 122 parallel and equally spaced apart from each other by edges 124. Outwardly facing surface 126 is smooth to effectively repel paint. Longitudinal lines 128 are parallel and equally spaced apart from each other by horizontal border line 134, all of which form a H-shaped die-cut that define surfaces 131. Surfaces 131 may be lifted outwardly from horizontal border line 134 at hinges 130, to facilitate the mounting of cover plate cover assembly 120 upon typical prior art cover plate 520 having a switch, such as switch 561. Surfaces 132 may be lifted outwardly along their respective perforations 138 at hinges 137, to facilitate the mounting of cover plate cover assembly 120 upon typical prior art cover plate 520 having outwardly facing surface 526 and receptacles 532.

Although not illustrated, it is noted that cover plate cover assembly 120, seen in FIG. 5, also comprises wax paper at predetermined areas of its inwardly facing surface. Similarly as for cover plate cover assembly 20; the wax paper comprises at least one corner tab to facilitate a user in removing the wax paper from adhesive tabs, defined as adhesive means. It is noted that the corner tabs do not have adhesive matter thereon. The adhesive tabs have adhesive means such as glue that functions to keep cover plate cover assembly 120 securely adhered upon typical prior art cover plate 520 when employed effectively as a paint shield.

For illustrative purposes, connectors 139 are connecting surfaces 132 to surfaces 131, and one set of surfaces 31 to each other at horizontal borderline 134.

Figure 8:
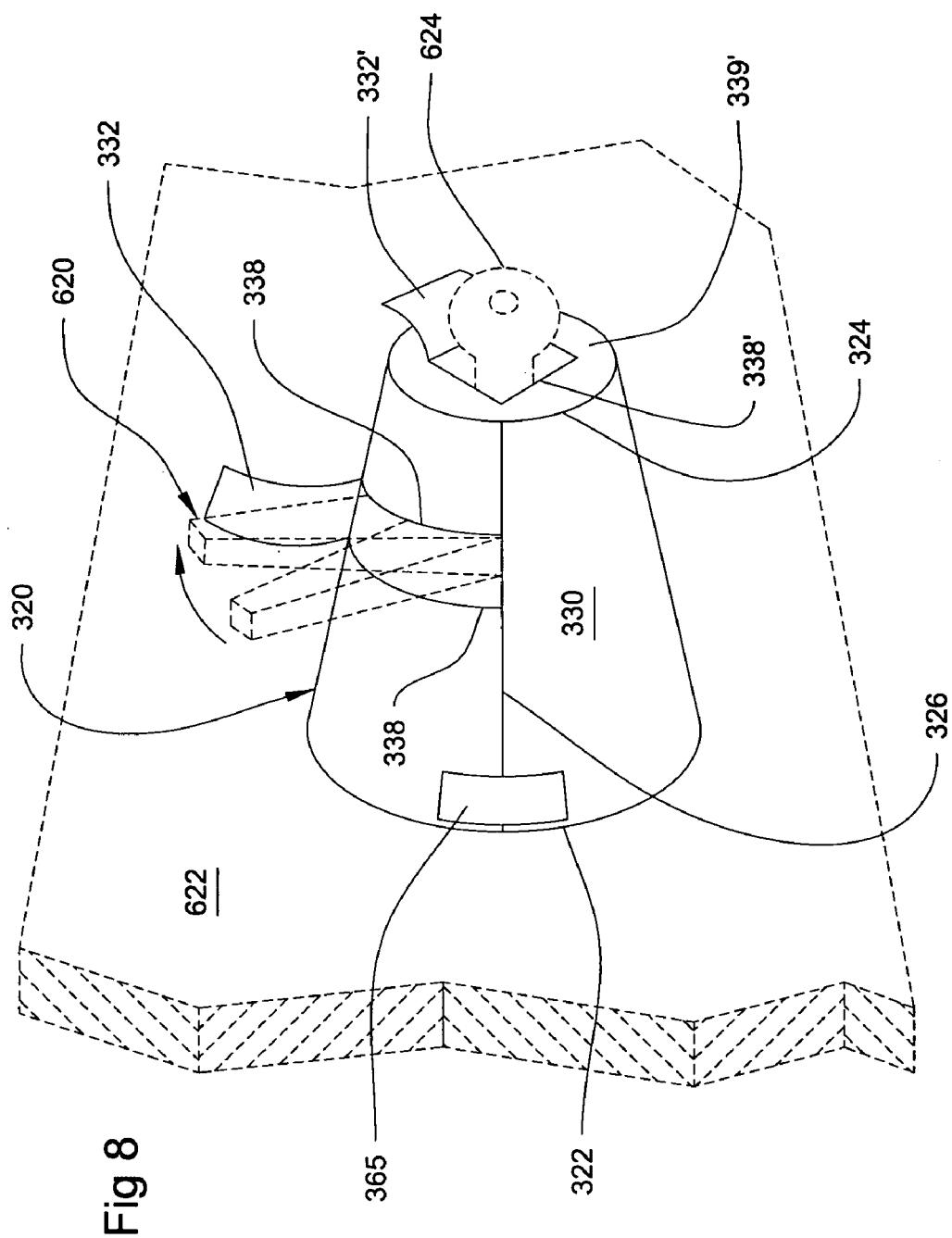
FIG. 8 shows a perspective view of a coiled doorknob cover assembly 320 mounted on a doorknob assembly 620.

Seen in FIGS. 6 and 7 is an uncoiled doorknob cover assembly 320. Doorknob cover assembly 320 is conical in shape and comprises outwardly facing surface 330 and inwardly facing surface 360 defined by edges 322, 324, 326, and 328. At a predetermined area of doorknob cover assembly 320 is surface 332 that is defined by perforations 338. Surface 332 may be lifted outwardly along perforations 338 at hinge 337, to facilitate the mounting of doorknob cover assembly 320 upon typical prior art doorknob assembly 620, having an elongated handle, as seen in FIG. 8. Extending from edge 324 is face 339'. In the preferred embodiment, face 339' is circular as seen in the illustration. Face 339' comprises surface 332' that is defined by perforations 338'. Surface 332' may be lifted outwardly along perforations 338' at hinge 337', to facilitate a user to insert a key, such as key 624, as seen in FIG. 8.

At predetermined areas of inwardly facing surface 360 is wax paper 362. In the preferred embodiment, wax paper 362 comprises at least one corner tab 366 to facilitate a user in removing wax paper 362 from adhesive tabs 364, defined as adhesive means. It is noted that corner tabs 366 do not have adhesive matter thereon. Adhesive tabs 364 are covered by wax paper 362 in this illustration. In the preferred embodiment, adhesive tabs 364 have adhesive means such as glue that functions to keep doorknob cover assembly 320 securely adhered upon a doorknob assembly 620, and in the preferred embodiment, abutting to the lock stile 622 when employed effectively as a paint shield. More specifically, the adhesive tabs 364 of inwardly facing surface 360 adhere upon the circular rim of a doorknob that abuts the lock stile 622 of a door, as seen in FIG. 8.

Extending from outwardly facing surface 330 is tab 365. It is noted that tab 365 is not adhesive on the side of outwardly facing surface 330, but it has adhesive tabs 364, as seen in FIG. 7 for as additional means to secure doorknob cover assembly 320 upon doorknob assembly 620.

In the preferred embodiment, instant invention 10 is made of recycled paper material such as thin cardboard.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A removable cover system to prevent application of paint on cover plates and doorknobs, comprising:

A) a cover plate cover assembly comprising a first outwardly facing surface and a first inwardly facing surface, said first outwardly facing surface having first and second edges parallel and equally spaced apart from each other by third and fourth edges, said first outwardly facing surface is smooth to effectively repel paint, said cover plate cover assembly also comprising longitudinal lines that are parallel and equally spaced apart from each other by a horizontal border line to define first surfaces, said first surfaces may be lifted outwardly from said horizontal border line at first hinges to facilitate mounting of said cover plate cover assembly upon a cover plate to use at least one switch, said first surfaces comprising second surfaces that may be lifted outwardly along first perforations at second hinges to facilitate mounting of said cover plate cover assembly upon said cover plate to use at least one receptacle, said first inwardly facing surface is matte and porous to effectively adhere to said cover plate, said first inwardly facing surface comprising at least one adhesive tab with wax paper, said wax paper having at least one corner tab to facilitate a user in removing said wax paper from said at least one adhesive tab, said at least one adhesive tab have first adhesive means to keep said cover plate cover assembly securely adhered to said cover plate; and B) a doorknob cover assembly that is conical in shape and abuts to a lock stile of a door, said doorknob cover assembly comprising a second outwardly facing surface and a second inwardly facing surface, said second inwardly facing surface comprising at least one adhesive tab with wax paper, said wax paper of said second inwardly facing surface having at least one corner tab to facilitate said user in removing said wax paper of said second inwardly facing surface from said at least one adhesive tab of said second inwardly facing surface, said at least one adhesive tab have second adhesive means to keep said doorknob cover assembly securely adhered upon a doorknob assembly.

2. The removable cover system to prevent application of paint on cover plates and doorknobs according to claim 1, further characterized in that said doorknob cover assembly adheres upon a rim of said doorknob assembly abutting said lock stile of said door.

3. The removable cover system to prevent application of paint on cover plates and doorknobs according to claim 2, further characterized in that said doorknob cover assembly comprises third surfaces defined by second perforations, said third surfaces maybe lifted outwardly along said second perforations at third hinges to facilitate the mounting of said doorknob cover assembly upon said doorknob assembly having an elongated handle.

4. The removable cover system to prevent application of paint on cover plates and doorknobs according to claim 3, further characterized in that said doorknob cover assembly comprises a doorknob face having a fourth surfaces that is defined by third perforations, said fourth surfaces may be lifted outwardly along fourth perforations at fourth hinges to facilitate said user to insert a key into said doorknob assembly.

5. The removable cover system to prevent application of paint on cover plates and doorknobs according to claim 4, further characterized in that said first and second surfaces comprise connectors to connect said second surfaces to said first surfaces, and said first surfaces to each other at said horizontal border line.

6. The removable cover system to prevent application of paint on cover plates and doorknobs according to claim 5, further characterized in that said doorknob cover assembly and said doorknob cover assembly are made of recycled paper material.

* * * * *